United States Patent
Hasenberg et al.

(10) Patent No.: US 10,773,958 B2
(45) Date of Patent: Sep. 15, 2020

(54) PROCESSES FOR REMOVING POLYSULFANES AND ELEMENTAL SULFUR FROM HYDROGEN SULFIDE

(71) Applicant: Chevron Phillips Chemical Company LP, The Woodlands, TX (US)

(72) Inventors: Daniel M. Hasenberg, Kingwood, TX (US); Mitchell D. Refvik, Bartlesville, OK (US); Michael S. Matson, Bartlesville, OK (US); Maruti Bhandarkar, Kingwood, TX (US); Ronald D. Knudsen, Saratoga Springs, UT (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 367 days.

(21) Appl. No.: 14/221,327

(22) Filed: Mar. 21, 2014

(65) Prior Publication Data

US 2015/0266734 A1 Sep. 24, 2015

(51) Int. Cl.
| B01D 53/86 | (2006.01) |
| C01B 17/16 | (2006.01) |
| B01D 53/48 | (2006.01) |

(52) U.S. Cl.
CPC .......... *C01B 17/168* (2013.01); *B01D 53/485* (2013.01); *B01D 53/8606* (2013.01); *C01B 17/162* (2013.01); *B01D 2257/308* (2013.01)

(58) Field of Classification Search
None
See application file for complete search history.

(56) References Cited

U.S. PATENT DOCUMENTS

| 4,511,668 | A | 4/1985 | Nozue et al. |
| 5,686,056 | A | 11/1997 | Kimtantas |
| 7,153,415 | B2 | 12/2006 | Podrebarac et al. |
| 7,326,393 | B2 | 2/2008 | Möller et al. |
| 7,604,788 | B2 | 10/2009 | Möller et al. |
| 7,618,558 | B2 | 11/2009 | Nielsen |
| 7,736,618 | B2 | 6/2010 | Redlingshoefer et al. |
| 7,833,509 | B2 | 11/2010 | Wölfert et al. |
| 7,887,777 | B2 | 2/2011 | Wölfert et al. |
| 8,569,527 | B2 | 10/2013 | Matusz |
| 2004/0000506 | A1 | 1/2004 | Podrebarac et al. |
| 2005/0265913 | A1* | 12/2005 | Moller .............. C01B 17/168 423/242.2 |

(Continued)

FOREIGN PATENT DOCUMENTS

| CA | 2674554 | 7/2008 |
| CN | 101583563 | 11/2009 |

(Continued)

OTHER PUBLICATIONS

Chester et al., "Mixing dynamics in catalyst impregnation in double-cone blenders", Powder Technology 102 (1999) 85-94.*

(Continued)

*Primary Examiner* — Anita Nassiri-Motlagh
(74) *Attorney, Agent, or Firm* — Merchant & Gould P.C.

(57) ABSTRACT

Disclosed are processes for purifying feed streams containing hydrogen sulfide and sulfur-containing impurities by removing sulfur-containing impurities, such as elemental sulfur and polysulfanes, using solid catalytic sorbents. Also disclosed are processes for producing hydrogen sulfide.

19 Claims, 2 Drawing Sheets

(56) References Cited

U.S. PATENT DOCUMENTS

| | | | |
|---|---|---|---|
| 2006/0233687 A1 | 10/2006 | Nielsen | |
| 2009/0053130 A1 | 2/2009 | Redlingshoefer et al. | |
| 2009/0317322 A1 | 12/2009 | Wölfert et al. | |
| 2010/0008839 A1 | 1/2010 | Wölfert et al. | |
| 2011/0230693 A1* | 9/2011 | Riley | C07C 2/66 585/448 |
| 2011/0263894 A1* | 10/2011 | Woelfert | C07C 303/16 562/118 |

FOREIGN PATENT DOCUMENTS

| | | |
|---|---|---|
| DE | 2511679 | 2/1963 |
| EP | 1 542 924 B1 | 2/2006 |
| EP | 1 542 925 B1 | 3/2009 |
| GB | 917501 | 7/1967 |
| GB | 1332337 | 10/1973 |
| GB | 1074967 | 8/2001 |
| RU | 2197318 | 8/2001 |
| RU | 2327731 | 2/2006 |
| RU | 2417825 | 4/2006 |
| RU | 2424976 | 4/2007 |
| RU | 2474470 | 5/2008 |
| WO | WO 2004/022482 A2 | 3/2004 |
| WO | WO 2004/028963 A1 | 4/2004 |
| WO | 2004041971 | 5/2004 |
| WO | 2008144402 | 11/2008 |

OTHER PUBLICATIONS

Alptekin et al., "Sorbents for Natural Gas Desulfurization", ESC Transactions, 12(1) 563-570 (2008).*

Calgon Carbon Product Bulletin entitled "ST I X Pelleted Impregnated Activated Carbon," 2012, pp. 1211-1212.

International Search Report and the Written Opinion of the International Searching Authority in PCT/US2015/021146 dated Jun. 16, 2015, 8 pages.

Alptekin, et. al. "Sorbents for Natural Gas Desulfurization." ECS Transactions, 12 (1) 536-570. 2008.

EP Office Action from application No. 15718392.2 dated Apr. 9, 2019, 5 pages.

* cited by examiner

FIG. 1

FIG. 2

PROCESSES FOR REMOVING POLYSULFANES AND ELEMENTAL SULFUR FROM HYDROGEN SULFIDE

BACKGROUND OF THE INVENTION

The present invention relates generally to processes for purifying $H_2S$ feed streams, and to the removal of sulfur-containing impurities, such as elemental sulfur and polysulfanes.

SUMMARY OF THE INVENTION

This summary is provided to introduce a selection of concepts in a simplified form that are further described herein. This summary is not intended to identify required or essential features of the claimed subject matter. Nor is this summary intended to be used to limit the scope of the claimed subject matter.

Processes for purifying feed streams containing hydrogen sulfide ($H_2S$) and sulfur-containing impurities (e.g., elemental sulfur, polysulfanes) are disclosed herein. In accordance with an embodiment of the present invention, one such process can comprise contacting the feed stream with a solid catalytic sorbent to remove at least a portion of the sulfur-containing impurities from the feed stream to form a purified $H_2S$ stream. The solid catalytic sorbent can comprise a clay, an alkali metal hydroxide or alkaline earth metal hydroxide impregnated activated carbon, an alkali metal hydroxide or alkaline earth metal hydroxide impregnated alumina, an alkali metal hydroxide or alkaline earth metal hydroxide impregnated alumina combined with a clay, or an alkali metal hydroxide or alkaline earth metal hydroxide impregnated alumina combined with an activated carbon, as well as any combination thereof. These processes can provide unexpectedly efficient removal of the sulfur-containing impurities, resulting in a higher purity, or purified, $H_2S$ stream.

In another embodiment, a process for purifying a feed stream comprising hydrogen sulfide ($H_2S$) and sulfur-containing impurities is disclosed, and in this embodiment, the process can comprise (i) contacting the feed stream with a drying agent to remove at least a portion of moisture ($H_2O$) from the feed stream; and (ii) contacting the moisture ($H_2O$) reduced feed stream with a solid catalytic sorbent to remove at least a portion of the sulfur-containing impurities from the feed stream to form a purified $H_2S$ stream. Unexpectedly, the incorporation of a drying step can increase the amount of sulfur-containing impurities removed from the feed stream, resulting in a higher purity $H_2S$ stream.

Additionally, processes for producing $H_2S$ are disclosed herein. Generally, these processes can comprise (a) contacting hydrogen and sulfur under conditions sufficient to produce a feed stream comprising hydrogen sulfide ($H_2S$) and sulfur-containing impurities; and (b) contacting the feed stream with a solid catalytic sorbent to remove at least a portion of the sulfur-containing impurities from the feed stream to form a purified $H_2S$ stream. Optionally, the feed stream can be contacted with a drying agent prior to step (b) and the moisture ($H_2O$) reduced feed stream can be contacted with the solid catalytic sorbent to remove at least a portion of the sulfur-containing impurities from the feed stream to form a purified $H_2S$ stream.

Both the foregoing summary and the following detailed description provide examples and are explanatory only. Accordingly, the foregoing summary and the following detailed description should not be considered to be restrictive. Further, features or variations can be provided in addition to those set forth herein. For example, certain embodiments can be directed to various feature combinations and sub-combinations described in the detailed description.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition can be applied. To the extent that any definition or usage provided by any document incorporated herein by reference conflicts with the definition or usage provided herein, the definition or usage provided herein controls.

Herein, features of the subject matter can be described such that, within particular aspects and/or embodiments, a combination of different features can be envisioned. For each and every aspect, and/or embodiment, and/or feature disclosed herein, all combinations that do not detrimentally affect the designs, processes, and/or methods described herein are contemplated with or without explicit description of the particular combination. Additionally, unless explicitly recited otherwise, any aspect, and/or embodiment, and/or feature disclosed herein can be combined to describe inventive features consistent with the present disclosure.

Regarding claim transitional terms or phrases, the transitional term "comprising," which is synonymous with "including," "containing," "having," or "characterized by," is open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristics of the claimed invention. A "consisting essentially of" claim occupies a middle ground between closed claims that are written in a "consisting of" format and fully open claims that are drafted in a "comprising" format. Absent an indication to the contrary, describing a composition or method as "consisting essentially of" is not to be construed as "comprising," but is intended to describe the recited element that includes materials or steps which do not significantly alter the composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to the feature class to which it is utilized, and it is possible to have different transitional terms or phrases utilized with different features within a claim. For example, a method can comprise several recited steps (and other non-recited steps), but utilize a catalytic sorbent consisting of specific components; alternatively, consisting essentially of specific components; or alternatively, comprising the specific components and other non-recited components. While compositions and methods are described in terms of "comprising" various components or steps, the compositions and methods can also "consist essentially of" or "consist of" the various components or steps, unless specifically stated otherwise. For example, a drying agent consistent with certain embodiments of the present invention can comprise; alternatively, consist essentially of; or alternatively, consist of a molecular sieve.

The terms "a," "an," and "the" are intended to include plural alternatives, e.g., at least one, unless otherwise specified. For instance, the disclosure of "a solid catalytic sorbent" is meant to encompass one, or mixtures or combinations of more than one, solid catalytic sorbent, unless otherwise specified.

The terms "contact product," "contacting," and the like, are used herein to describe compositions and methods wherein the components are contacted together in any order, in any manner, and for any length of time. For example, the components can be contacted by blending or mixing. Further, unless otherwise specified, the contacting of any component can occur in the presence or absence of any other component of the compositions and methods described herein. Combining additional materials or components can be done by any suitable method. Further, the term "contact product" includes mixtures, blends, solutions, slurries, reaction products, and the like, or combinations thereof. Although "contact product" can, and often does, include reaction products, it is not required for the respective components to react with one another. Similarly, the term "contacting" is used herein to refer to materials which can be blended, mixed, slurried, dissolved, reacted, treated, or otherwise contacted in some other manner. Hence, "contacting" two or more components can result in a mixture, a reaction product, a reaction mixture, etc.

Although any methods and materials similar or equivalent to those described herein can be used in the practice or testing of the invention, the typical methods and materials are herein described.

All publications and patents mentioned herein are incorporated herein by reference. The publications and patents mentioned herein can be utilized for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

DETAILED DESCRIPTION OF THE INVENTION

Disclosed herein are processes for purifying a feed stream which can comprise hydrogen sulfide ($H_2S$) and sulfur-containing impurities using a solid catalytic sorbent to form a purified $H_2S$ stream. Also disclosed herein are processes which further employ a drying step, as well as improved $H_2S$ production processes.

Processes for Removing Impurities from Hydrogen Sulfide Streams

Embodiments of this invention are directed to processes for purifying feed streams comprising (or consisting essentially of, or consisting of) hydrogen sulfide ($H_2S$) and sulfur-containing impurities. Herein, the terms "feed stream," "feed streams," "$H_2S$ feed stream," "$H_2S$ feed streams," and/or their derivatives refer to a feed stream or feed streams comprising (or consisting essentially of, or consisting of) hydrogen sulfide ($H_2S$) and sulfur-containing impurities. Such processes can comprise (or consist essentially of, or consist of) contacting the feed stream with a solid catalytic sorbent to remove at least a portion of the sulfur-containing impurities from the feed stream to form a purified $H_2S$ stream. Generally, the features of the processes (e.g., the components and/or features of the feed stream, the solid catalytic sorbent (e.g., material options, single or mixed or segregated beds), the components and/or features of the purified stream, and the process conditions under which the feed stream and solid catalytic sorbent are contacted, among others) are independently described herein, and these features can be combined in any combination to further describe the disclosed purification processes.

In some embodiments, the sulfur-containing impurities can comprise (or consist essentially of, or consist of) elemental sulfur, polysulfanes, or both. Polysulfanes have the general formula, $H_2S_n$, where $n \geq 2$, and can decompose to form $H_2S$ and elemental sulfur. Both polysulfanes and elemental sulfur can be detrimental in a $H_2S$ stream, for example, due to deposits or plate-out on pipes, valve, heat exchangers, compressors, and other process equipment.

The feed stream typically contains at least 80 wt. % $H_2S$, although not limited thereto. In some embodiments, for instance, the feed stream can comprise a minimum of 80 wt. %, 82 wt. %, 85 wt. %, 88 wt. %, 90 wt. %, 95 wt. %, 98 wt. %, or 99 wt. A $H_2S$; additionally or alternatively, a maximum of 99.999 wt. %, 99.99 wt. %, 99.9 wt. %, 99.8 wt. %, 99.5 wt. %, 99 wt. %, or 98.5 wt. % $H_2S$. Generally, the weight percent of $H_2S$ that can be present in the feed stream can be in a range from any minimum weight percent disclosed herein to any maximum weight percent disclosed herein. Therefore, the feed stream can contain the following non-limiting ranges of the weight percent of $H_2S$: from 80 to 99.999 wt. %, from 80 to 99.99 wt. %, from 80 to 99.9 wt. %, from 90 to 99.9 wt. %, from 90 to 99.5 wt. %, from 95 to 99.999 wt. %, or from 95 to 99.9 wt. %. Other appropriate ranges for the wt. % $H_2S$ in the feed stream are readily apparent from this disclosure.

Although not limited thereto, sulfur-containing impurities in the feed stream typically are a minor component of the feed stream, often present at less than 1000-1500 ppm by weight. For example, in some embodiments, the feed stream can comprise a minimum of 5 ppm, 10 ppm, 15 ppm, 20 ppm, 25 ppm, 50 ppm, 75 ppm, 100 ppm, or 250 ppm (by weight) of sulfur-containing impurities; additionally or alternatively, a maximum of 1000 ppm, 750 ppm, 500 ppm, 400 ppm, 350 ppm, 300 ppm, or 250 ppm (by weight) of sulfur-containing impurities. Generally, the ppm by weight of sulfur-containing impurities that can be present in the feed stream can be in a range from any minimum ppm disclosed herein to any maximum ppm disclosed herein. Therefore, the feed stream can contain the following non-limiting amounts, by weight, of sulfur-containing impurities: from 5 to 1000 ppm, from 5 to 500 ppm, from 5 to 250 ppm, from 10 to 1000 ppm, from 10 to 500 ppm, from 10 to 250 ppm, from 10 to 100 ppm, from 25 ppm to 750 ppm, or from 25 ppm to 250 ppm. Other appropriate ranges for the amount of sulfur-containing impurities present in the feed stream are readily apparent from this disclosure.

The processes disclosed herein are very effective at removing sulfur-containing impurities from $H_2S$-rich feed streams. In an embodiment, the purified $H_2S$ stream can comprise a minimum of 0.5 ppm, 1 ppm, 2 ppm, 3 ppm, 4 ppm, 5 ppm, or 10 ppm (by weight) of sulfur-containing impurities; additionally or alternatively, a maximum of 250 ppm, 100 ppm, 75 ppm, 50 ppm, 40 ppm, 30 ppm, or 25 ppm (by weight) of sulfur-containing impurities. Generally, the ppm by weight of sulfur-containing impurities that can be present in the purified $H_2S$ stream can be in a range from any minimum ppm disclosed herein to any maximum ppm disclosed herein. Therefore, the purified $H_2S$ stream can contain the following non-limiting amounts, by weight, of sulfur-containing impurities: from 0.5 to 100 ppm, from 0.5 to 50 ppm, from 0.5 to 25 ppm, from 1 to 100 ppm, from 1 to 75 ppm, from 1 to 25 ppm, from 5 to 250 ppm, from 5 ppm to 100 ppm, or from 5 ppm to 50 ppm. Other appropriate ranges for the amount of sulfur-containing impurities in the purified $H_2S$ stream are readily apparent from this disclosure.

The effectiveness of the disclosed processes in removing sulfur-containing impurities also can be quantified by determining the percentage amount of the sulfur-containing impurities removed from the feed stream to form the purified $H_2S$ stream (i.e., based on the amount of sulfur-containing impurities in the purified $H_2S$ stream versus the amount of sulfur-containing impurities in the feed stream). The amount of the sulfur-containing impurities removed from the feed stream to form the purified $H_2S$ stream can be, for example, at least 50 wt. %, at least 55 wt. %, at least 58 wt. %, at least 60 wt. %, at least 62 wt. %, at least 65 wt. %, at least 68 wt. %, or at least 70 wt. %, based upon the total amount of sulfur-containing impurities in the feed stream; additionally or alternatively, a maximum of 99.99 wt. %, 99.9 wt. %, 99 wt. %, 98.5 wt. %, 98 wt. %, 95 wt. %, or 90 wt. %, based upon the total amount of sulfur-containing impurities in the feed stream. Generally, the weight percent of sulfur-containing impurities removed from the feed stream to form the purified $H_2S$ stream can be in a range from any minimum weight percent disclosed herein to any maximum weight percent disclosed herein. Therefore, the amount of sulfur-containing impurities removed using the processes disclosed herein can fall within the following non-limiting ranges: from 50 to 99.99 wt. %, from 50 to 99.9 wt. %, from 50 to 99 wt. %, from 60 to 99.9 wt. %, from 60 to 98 wt. %, from 60 to 95 wt. %, or from 65 to 99 wt. %, based upon the total amount of sulfur-containing impurities in the feed stream. Other appropriate sulfur-containing impurity removal ranges are readily apparent from this disclosure.

The feed stream and the solid catalytic sorbent can be contacted at any suitable temperature, for instance, at a minimum temperature of 0° C., 5° C., 10° C., 15° C., or 20° C.; additionally or alternatively, at a maximum temperature of 75° C., 70° C., 65° C., 60° C., 55° C., 50° C., 45° C., 40° C., or 30° C. Generally, the temperature at which the feed stream and the solid catalytic sorbent can be contacted can be in a range from any minimum temperature disclosed herein to any maximum temperature disclosed herein. Suitable non-limiting ranges for this contacting temperature can include the following ranges: from 0° C. to 50° C., from 5° C. to 45° C., from 10° C. to 45° C., from 15° C. to 45° C., from 20° C. to 40° C., or from 15° C. to 35° C. Other appropriate temperature ranges at which the feed stream and the solid catalytic sorbent can be contacted are readily apparent from this disclosure.

The feed stream and the solid catalytic sorbent can be contacted at any suitable pressure, for instance, at a minimum pressure of 34 kPa (5 psia), 70 kPa (10 psia), 103 kPa (15 psia), 173 kPa (25 psia), 345 kPa (50 psia), 517 kPa (75 psia), and 689 kPa (100 psia); additionally or alternatively, at a maximum pressure of 3.4 MPa (500 psia), 2.8 MPa (400 psia), 2 MPa (300 psia), 1.7 MPa (250 psia), 1.3 MPa (200 psia), or 1.0 MPa (150 psia). Generally, the pressure at which the feed stream and the solid catalytic sorbent can be contacted can be in a range from any minimum pressure disclosed herein to any maximum pressure disclosed herein. Suitable non-limiting ranges for the pressure at which the feed stream and the solid catalytic sorbent can be contacted can include the following ranges: from 34 kPa (5 psia) to 2 MPa (300 psia), from 103 kPa (15 psia) to 1.7 MPa (250 psia), from 173 kPa (25 psia) to 1.3 MPa (200 psia), from 70 kPa (5 psia) to 1.3 MPa (200 psia), or from 70 kPa (5 psia) to 1.0 MPa (150 psia). Other appropriate pressure ranges at which the feed stream and the solid catalytic sorbent can be contacted are readily apparent from this disclosure.

Often, the process for purifying the feed stream can be a flow process and/or a continuous process. In such circumstances, the feed stream-solid catalytic sorbent contact time (or reaction time) can be expressed in terms of weight hourly space velocity (WHSV)—the ratio of the weight of feed stream which comes in contact with a unit weight of solid catalytic sorbent per unit time (units of g/g/hr). In some embodiments, the process can be conducted at minimum WHSV of 0.05, 0.1, 0.25, 0.5, 0.75, or 1; additionally or alternatively, a maximum value of 5, 4, 3, 2.5, or 2. Generally, the WHSV can be in a range from any minimum WHSV disclosed herein to any maximum WHSV disclosed herein. Suitable WHSV ranges can include, but are not limited to, from 0.05 to 5; alternatively, from 0.05 to 4; alternatively, from 0.1 to 5; alternatively, from 0.1 to 4; alternatively, from 0.1 to 3; alternatively, from 0.1 to 2; alternatively, from 0.2 to 2; alternatively, from 0.2 to 1; alternatively, from 0.5 to 5; alternatively, from 0.4 to 2.5; alternatively, from 0.5 to 2.5; alternatively, from 0.8 to 3; or alternatively, from 1 to 3. Other appropriate WHSV ranges are readily apparent from this disclosure.

Any suitable reactor or vessel can be used to purify the feed stream, non-limiting examples of which can include a flow reactor, a continuous reactor, a fixed bed reactor, and a stirred tank reactor, including more than one reactor in series or in parallel, and including any combination of reactor types and arrangements. In particular embodiments consistent with this invention, the feed stream can contact a fixed bed of the solid catalytic sorbent in a suitable vessel, e.g., in a continuous fixed bed reactor. In further embodiments, combinations of more than one solid catalytic sorbent can be used, such as a mixed bed of a first catalytic sorbent and a second catalytic sorbent, or sequential beds of a first catalytic sorbent and a second catalytic sorbent. In these and other embodiments, the feed stream can flow upward or downward through the fixed bed. For instance, the feed stream can contact the first catalytic sorbent and then the second catalytic sorbent in a downward flow orientation, and the reverse in an upward flow orientation.

In some embodiments of this invention, the purification process can further comprise a step of contacting the feed stream with a drying agent to remove at least a portion of any moisture ($H_2O$) present in the feed stream, prior to and/or concurrently with contacting the feed stream with the solid catalytic sorbent. Hence, a process to purify a feed stream comprising hydrogen sulfide ($H_2S$) and sulfur-containing impurities can comprise (i) contacting the feed stream with a drying agent to remove at least a portion of moisture ($H_2O$) from the feed stream; and (ii) contacting the moisture ($H_2O$) reduced feed stream with a solid catalytic sorbent to remove at least a portion of the sulfur-containing impurities from the feed stream to form a purified $H_2S$ stream. This process encompasses circumstances where step (i) and step (ii) are conducted concurrently, such as in a mixed bed of a drying agent and a solid catalytic sorbent. The drying agent can be in the same vessel as the solid catalytic sorbent (e.g., sequential beds and/or mixed beds), or the drying step can be conducted in a vessel upstream of the vessel containing the catalytic sorbent.

Wet or moisture-containing feed streams, prior to contacting the drying agent, often can comprise a minimum of 0.00001 wt. %, 0.0001 wt. %, 0.001 wt. %, 0.002 wt. %, 0.005 wt. %, 0.01 wt. %, 0.1 wt. %, 1 wt. %, 2 wt. %, or 5 wt. % $H_2O$; additionally or alternatively, a maximum of 15 wt. %, 10 wt. %, 5 wt. %, 2 wt. %, 1 wt. %, or 0.1 wt. % $H_2O$. Generally, the weight percent of $H_2O$ that can be present in the feed stream can be in a range from any minimum weight percent disclosed herein to any maximum weight percent disclosed herein. Therefore, the feed stream can contain the following non-limiting ranges of the weight percent of $H_2O$: from 0.00001 to 15 wt. %, from 0.005 to 15 wt. %, from 0.05 to 10 wt. %, from 0.001 to 10 wt. %, from 0.1 to 5 wt. %, from 1 to 15 wt. %, from 0.001 to 1 wt. %, or from 2 to 12 wt. %. Other appropriate ranges for the weight percent $H_2O$ in the feed stream are readily apparent from this disclosure.

The drying step can be very effective at removing moisture/$H_2O$ from the $H_2S$ feed stream. In some embodiments, the feed stream, after contacting the drying agent, can comprise a minimum of 0.1 ppm, 0.5 ppm, 1 ppm, 2 ppm, 5 ppm, 10 ppm, or 25 ppm (by weight) of $H_2O$; additionally or alternatively, a maximum of 1000 ppm, 500 ppm, 200 ppm, 100 ppm, 50 ppm, 10 ppm, or 5 ppm (by weight) of $H_2O$. Generally, the ppm by weight of $H_2O$ that can be present in the feed stream, after contacting the drying agent, can be in a range from any minimum ppm disclosed herein to any maximum ppm disclosed herein. Therefore, the amount of $H_2O$ in the feed stream, after contacting the drying agent, can contain the following non-limiting amounts, by weight, of $H_2O$: from 0.1 to 500 ppm, from 0.1 to 250 ppm, from 0.1 to 10 ppm, from 1 to 500 ppm, from 1 to 100 ppm, from 1 to 50 ppm, from 5 to 250 ppm, from 5 ppm to 100 ppm, or from 5 ppm to 50 ppm. Other appropriate ranges for the weight percent $H_2O$ in the feed stream after contact with the drying agent are readily apparent from this disclosure.

In the processes described herein, any suitable drying agent can be utilized. In some embodiments, the drying agent can comprise (or consist essentially of, or consist of) calcium chloride, calcium sulfate, magnesium sulfate, alumina, silica, or a molecular sieve, as well as any combination thereof; alternatively, calcium chloride; alternatively, calcium sulfate; alternatively, magnesium sulfate; alternatively, alumina; alternatively, silica; or alternatively, a molecular sieve. One or more than one drying agent can be used in various embodiments of this invention. In one embodiment, for example, the drying agent can comprise (or consist essentially of, or consist of) calcium sulfate; alternatively, a molecular sieve; alternatively, a 3 A molecular sieve; or alternatively, a UOP Type 3 A molecular sieve.

Unexpectedly, the processes disclosed herein can be conducted for relatively long periods of time with significant percentages of the sulfur-containing impurities being removed from the feed stream to form the purified $H_2S$ stream. For example, processes consistent with the present invention can remove at least 45 wt. % (or at least 50 wt. %, or at least 55 wt. %, or at least 60 wt. %, or any percentage amount disclosed herein) of the sulfur-containing impurities for a time period of at least 5 hours, at least 10 hours, at least 24 hours, at least 48 hours, at least 100 hours, at least 200 hours, at least 250 hours, at least 300 hours, at least 400 hours, and so forth. In some embodiments, the amount of sulfur-containing impurities removed can be at least 45 wt. % (or at least 50 wt. %, or at least 55 wt. %, or at least 60 wt. %, or any percentage amount disclosed herein) for a maximum time period of 10000 hours, 7500 hours, 5000 hours, 2000 hours, 1500 hours, 1000 hours, 750 hours, 500 hours, or 250 hours. Generally, a minimum percentage amount of the sulfur-containing impurities can be removed over a time period ranging from any minimum time period to any maximum time period disclosed herein. In some non-limiting embodiments, the length of the time period, in which a specific minimum amount of the sulfur-containing impurities is removed from the feed stream, can be in a range from 5 to 10000 hours, 5 to 1000 hours, from 5 to 750 hours, from 5 to 500 hours, from 5 to 50 hours, from 24 to 1000 hours, from 24 to 250 hours, from 100 to 1000 hours, from 100 to 750 hours, or from 250 to 1500 hours. Other ranges of time periods are readily apparent from this disclosure. As an example, these long periods of time with significant percentages of the sulfur-containing impurities being removed can be achieved in a flow or continuous process, such as, for example, in a continuous fixed bed reactor.

Solid Catalytic Sorbents

Embodiments of this invention are directed to processes for purifying a feed stream comprising $H_2S$ and sulfur-containing impurities (e.g., elemental sulfur, polysulfanes). Such processes can comprise contacting the feed stream with a solid catalytic sorbent to remove at least a portion of the sulfur-containing impurities from the feed stream to form a purified $H_2S$ stream. Solid catalytic sorbents contemplated herein can encompass a variety of specific materials, and these materials, while not wishing to be bound by theory, can absorb elemental sulfur, or can catalytically decompose polysulfanes (e.g., to form $H_2S$ and elemental sulfur), or can absorb elemental sulfur and catalytically decompose polysulfanes, or can operate by some other mechanism. Regardless of the manner in which the materials described herein operate, they are collectively referred to as solid catalytic sorbents.

In an embodiment, the solid catalytic sorbent can comprise a clay, an alkali metal hydroxide or alkaline earth metal hydroxide impregnated activated carbon, an alkali metal hydroxide or alkaline earth metal hydroxide impregnated alumina, an alkali metal hydroxide or alkaline earth metal hydroxide impregnated alumina combined with a clay, or an alkali metal hydroxide or alkaline earth metal hydroxide impregnated alumina combined with an activated carbon, as well as any combination thereof. Hence, combinations (e.g., a mixed bed, sequential beds) of different solid catalytic sorbents can be employed. Within the present application and claims, alkali metal hydroxide or alkaline earth metal hydroxide impregnated refers to all methods of introducing an alkali metal hydroxide or alkaline earth metal hydroxide into the material (e.g., contacting or treating the material with an alkali metal hydroxide or alkaline earth metal hydroxide, among other methods).

As utilized herein, the terms "alkali metal hydroxide or alkaline earth metal hydroxide impregnated," its subforms (e.g., "alkali metal hydroxide impregnated," or "alkaline earth metal hydroxide impregnated"), and/or derivatives, refer to all forms of a clay, alumina, and/or carbon that has been treated with an alkali metal hydroxide or alkaline earth metal hydroxide. As such, the terms "alkali metal hydroxide or alkaline earth metal hydroxide impregnated," its subforms (e.g., "alkali metal hydroxide impregnated," or "alkaline earth metal hydroxide impregnated"), and/or derivatives, refer to clays, aluminas, or activated carbons having alkali metal hydroxide, alkaline earth metal hydroxide, alkali metal oxide, and/or alkaline earth metal oxide present in the material.

In some embodiments, the solid catalytic sorbent can comprise a clay, such as, for instance, a Filtrol® clay, an Oil-Dri® clay, an alkali metal hydroxide or alkaline earth metal hydroxide impregnated clay, as well as combinations thereof. In one embodiment, the clay can comprise a Filtrol® clay, while in another embodiment, the clay can comprise an Oil-Dri® clay. Yet, in another embodiment, the clay can comprise an alkali metal hydroxide or alkaline earth metal hydroxide impregnated clay. Any suitable base or caustic material can be used to prepare the alkali metal hydroxide or alkaline earth metal hydroxide impregnated clay, non-limiting examples of which can include sodium hydroxide, potassium hydroxide, and the like, as well as mixtures thereof. While not being limited thereto, the alkali metal hydroxide or alkaline earth metal hydroxide impregnated clay, activated carbon, and/or alumina can be prepared by mixing a clay, activated carbon, and/or alumina with an alkali metal hydroxide and/or alkaline earth metal hydroxide solution, allowing sufficient time for impregnation of the clay, activated carbon, and/or alumina, and then filtering, drying, and/or calcining the impregnated clay, activated carbon, and/or alumina.

In one embodiment, the solid catalytic sorbent can comprise an alkali metal hydroxide or alkaline earth metal hydroxide impregnated activated carbon, while in another embodiment, the solid catalytic sorbent can comprise an alkali metal hydroxide or alkaline earth metal hydroxide impregnated alumina. In some embodiments, the alkali metal hydroxide or alkaline earth metal hydroxide used to produce the impregnated material can comprise an alkali metal hydroxide. The alkali metal hydroxide can comprise lithium hydroxide, sodium hydroxide, potassium hydroxide, or a combination thereof; alternatively, lithium hydroxide; alternatively, sodium hydroxide; or alternatively, potassium hydroxide. In other embodiments, the alkali metal hydroxide or alkaline earth metal hydroxide used to produce the impregnated material can comprise an alkaline earth metal hydroxide. The alkaline earth metal hydroxide can comprise magnesium hydroxide, calcium hydroxide, strontium hydroxide, barium hydroxide, or a combination thereof; alternatively, magnesium hydroxide; alternatively, calcium hydroxide; alternatively, strontium hydroxide; or alternatively, barium hydroxide.

In certain embodiments, the alkali metal hydroxide or alkaline earth metal hydroxide impregnated activated carbon can be a sodium hydroxide and/or potassium hydroxide impregnated activated carbon. An illustrative example of a commercially-available alkali metal hydroxide or alkaline earth metal hydroxide impregnated activated carbon suitable for use as a solid catalytic sorbent as described herein is Calgon® Carbon ST1-X.

In certain embodiments, the alkali metal hydroxide or alkaline earth metal hydroxide impregnated alumina can be a sodium hydroxide and/or potassium hydroxide impregnated alumina. An illustrative example of a commercially-available alkali metal hydroxide or alkaline earth metal hydroxide impregnated alumina suitable for use as a solid catalytic sorbent as described herein is Selexsorb® COS.

While not limited thereto, solid catalytic sorbents suitable for use herein can have a surface area of at least 10 $m^2/g$, 20 $m^2/g$, 25 $m^2/g$, 40 $m^2/g$, 50 $m^2/g$, 75 $m^2/g$, or 100 $m^2/g$; additionally or alternatively, the solid catalytic sorbent can have a maximum surface area of 1000 $m^2/g$, 500 $m^2/g$, 400 $m^2/g$, 300 $m^2/g$, 250 $m^2/g$, 200 $m^2/g$, or 150 $m^2/g$. Generally, the surface area of the solid catalytic sorbent can be in a range from any minimum surface area disclosed herein to any maximum surface disclosed herein. Suitable non-limiting ranges for the surface area can include the following ranges: from 10 $m^2/g$ to 500 $m^2/g$, from 25 $m^2/g$ to 250 $m^2/g$, from 50 $m^2/g$ to 200 $m^2/g$, from 20 $m^2/g$ to 400 $m^2/g$, or from 40 $m^2/g$ to 300 $m^2/g$. Other appropriate ranges for the surface area of the solid catalytic sorbents are readily apparent from this disclosure.

The particle size (e.g., average particle size) of the solid catalytic sorbent generally is not limited to any particular range. The appropriate particle size can be determined based on the design of the vessel/reactor in which the purification process is conducted, the feed stream flow rate, and pressure drop limitations, amongst other considerations. In some embodiments, pellets or granules of the catalytic sorbent can be used, while in other embodiments, particulates having average particle sizes in the 5 mesh to 100 mesh range can be used; alternatively, in the 5 mesh to 50 mesh range; alternatively, in the 7 mesh to 40 mesh range; or alternatively, in the 8 mesh to 35 mesh range. Other appropriate ranges for the particle size of the solid catalytic sorbents are readily apparent from this disclosure.

Combinations of more than one solid catalytic sorbent can be used in the disclosed processes for purifying feed streams comprising $H_2S$ and sulfur-containing impurities. In one embodiment, for example, the solid catalytic sorbent can comprise an alkali metal hydroxide or alkaline earth metal hydroxide impregnated alumina combined with a clay. In another embodiment, the solid catalytic sorbent can comprise an alkali metal hydroxide or alkaline earth metal hydroxide impregnated alumina combined with an activated carbon. In another embodiment, the solid catalytic sorbent can comprise an alkali metal hydroxide or alkaline earth metal impregnated hydroxide alumina combined with an alkali metal hydroxide or alkaline earth metal hydroxide impregnated activated carbon. In yet another embodiment, the solid catalytic sorbent can comprise a clay in combination with an activated carbon. In still another embodiment, the solid catalytic sorbent can comprise a clay in combination with an alkali metal hydroxide or alkaline earth metal hydroxide impregnated activated carbon.

As described herein, combinations of more than one solid catalytic sorbent can be used in the disclosed processes for purifying feed streams comprising $H_2S$ and sulfur-containing impurities. For instance, the combination of the solid catalytic sorbents can comprise a mixed bed of the individual solid catalytic sorbents. Alternatively, the combination of the solid catalytic sorbents can comprise sequential beds of the individual solid catalytic sorbents, such as in one vessel or in two or more sequential separate vessels.

Hydrogen Sulfide Production Processes

Also encompassed herein are various processes for producing $H_2S$. One such $H_2S$ production process can comprise (or consist essentially of, or consist of) (a) contacting hydrogen and sulfur under conditions sufficient to produce a feed stream comprising hydrogen sulfide and sulfur-containing impurities; and (b) contacting the feed stream with a solid catalytic sorbent to remove at least a portion of the sulfur-containing impurities from the feed stream to form a purified $H_2S$ stream. In a further embodiment, the feed stream can be contacted with a drying agent prior to and/or concurrently with step (b), if desired. Generally, the features of the $H_2S$ production processes (e.g., the components and/or features of the step to produce $H_2S$, the components and/or features of the feed stream, the solid catalytic sorbent (e.g., material options, single or mixed or segregated beds), the components and/or features of the purified stream, and the process conditions under which the feed stream and solid catalytic sorbent are contacted, among others) are independently described herein, and these features can be combined in any combination to further describe the disclosed $H_2S$ production processes. Moreover, other process steps can be conducted before, during, and/or after any of the steps listed in the disclosed processes, unless stated otherwise.

The purification step (b) and optional drying step are discussed herein. Any embodiments and features of the purification step and/or the drying step described herein can be utilized in the processes for producing $H_2S$ and, accordingly, are encompassed herein.

In step (a), hydrogen and sulfur are contacted under conditions sufficient to produce a feed stream comprising hydrogen sulfide ($H_2S$) and sulfur-containing impurities. Any suitable method known to those of skill in the art for reacting hydrogen and sulfur (e.g., hydrogen gas and molten sulfur) to produce $H_2S$ can be utilized. Hydrogen and sulfur can be contacted and reacted under non-catalytic conditions, or a catalyst can be used. Suitable catalysts, temperatures, pressures, and reactant ratios are known to those of skill in the art and are described, for example, in U.S. Pat. Nos. 7,833,509 and 7,887,777.

In an embodiment, the $H_2S$ production process can be an in situ process, for example, steps (a)-(b) can be performed in the same reactor system. However, in an alternative embodiment, the purification step (b) can be conducted external to the reactor system utilized to produce the $H_2S$ feed stream, such as in another vessel and/or location. In additional embodiments, there can be a cooling step of any stream using methods and means known to those of skill in the art (e.g., all or a portion of the feed stream can be cooled in a heat exchanger after step (a), and then returned to the feed stream and/or processed through the purification steps/equipment).

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

The purification experiments were conducted utilizing a fixed bed apparatus. The apparatus was configured such that the $H_2S$ feed stream was fed from a vessel in a liquid state through a flow meter/controller. Once the $H_2S$ feed stream passed through the flow meter/controller, it was passed through a back pressure regulator, where the pressure was reduced to the desired value. The $H_2S$ feed stream was then passed through a three-way valve to either a sample/holding tank or the solid catalytic sorbent bed (or a drier bed and the solid catalytic sorbent bed) and then to a sample/holding tank. The solid catalytic sorbent bed (34.5" in length and ½" in diameter) was packed with 50 to 100 mL of the desired solid catalytic sorbent. The drier bed, when utilized, was 34.5" in length and ½" in diameter, and was packed with approximately 90 mL of the desired drying agent.

Sulfur impurity testing samples were obtained by passing the $H_2S$ feed stream, either untreated or purified, though the sample/holding tank for a predetermined amount of time to ensure that a representative sample was taken. The $H_2S$ feed stream flow was then directed to a sulfur impurity testing vessel containing a known amount of triphenylphosphine (TPP) solution. The $H_2S$ feed stream flow rate and time to the sulfur impurity testing vessel was monitored and recorded so that the total mass of $H_2S$ feed stream charged to the sulfur impurity testing vessel could be determined.

The amounts of elemental sulfur and polysulfanes in the hydrogen sulfide feed stream were determined by contacting a known amount of liquid $H_2S$ feed stream sample with a toluene solution of triphenylphosphine (TPP) in a pressurized vessel where the elemental sulfur and/or polysulfanes reacted with triphenylphosphine to form triphenylphosphine sulfide. The pressure was released from pressurized vessel and $H_2S$ removed from the toluene solution. The toluene solution was then analyzed using gas chromatography and the amount of triphenylphosphine sulfide found in the remaining toluene solution was compared against a calibration curve to determine the amount of elemental sulfur and/or polysulfanes in the hydrogen sulfide. An internal standard, triphenylphosphate was utilized to minimize variability between analyses. This method was found to provide reliable results down to low ppm concentrations of elemental sulfur and/or polysulfanes in $H_2S$, with an accuracy within ±2 ppm and a precision from analysis to analysis of ±1 ppm. The chemicals used were:

| Reagent | CAS No. | Purity (%) | Comments |
| --- | --- | --- | --- |
| Triphenylphosphine (TPP) | 603-35-0 | 99.0 | Protect from air to minimize oxidation to triphenylphosphine oxide |
| Triphenylphosphine Sulfide (TPPS) | 3878-45-3 | 99.0 | |
| Triphenylphosphate (TPPo4) | 115-86-6 | 99.0 | |
| Toluene, Reagent Grade | 108-88-3 | 99.5 | Purge with $N_2$ or argon to minimize oxygen and store to prevent oxygen build up |

Equipment used in this analytical method included volumetric flasks (500 mL and 50 mL), volumetric pipets (1 mL), gas chromatographic sample vials (1-10 mL), and gas chromatographic syringes (1-10 μL) capable of delivering a consistent 1 μL sample (either manually or automatically) into a GC. The GC used was capable of ramp heating from ambient temperature to 300° C., equipped with a heated split injector inlet, a 30 m HP-5 column (30 m×0.32 mm×0.25 μm film thickness) or equivalent, and a flame ionization detector (FID).

The testing vessel was a 250 mL to 1 L pressure vessel equipped with a means of receiving a liquid hydrogen sulfide sample (and maintaining the hydrogen sulfide in a liquid state), a stirrer, a sample port for sample retrieval, a means of heating/cooling the vessel to maintain room temperature (25° C.), a rupture disc or other pressure relief device rated for at least 800 psig at 22° C., a means to safely vent hydrogen sulfide (preferably to a flare system), a means to pass an inert gas (e.g. nitrogen) into the pressure vessel to pressurize the vessel to a desired pressure and/or to purge hydrogen sulfide from the analysis solution before sampling, and a drain (or other means) to remove analysis solution from the pressure vessel and to clean and dry the pressure vessel after use.

For calibration curve sample preparation, 1.95 g of triphenylphosphate and 250 mL of reagent grade toluene were added to a clean and dry 500 mL volumetric flask. The volumetric flask was then swirled to dissolve the triphenylphosphate. Calibration standard solutions, 10, were then prepared containing triphenylphosphine sulfide, triphenylphosphine, and triphenylphosphate having approximately the same phosphorus molar content. Each calibration standard solution was prepared by charging 1 mL of the triphenylphosphate stock solution, the appropriate amounts of triphenylphosphine and triphenylphosphine sulfide to prepare calibration standards having a triphenylphosphine sulfide to triphenylphosphate mass ratios covering a range from approximately 0.2 to approximately 360, and 25 mL of reagent grade toluene to clean, dry 50 mL volumetric flask. The 50 mL volumetric flask was then swirled to dissolve the TPP and TPPS. The 50 mL volumetric flask was then filled to the 50 mL line with reagent grade toluene. The contents of the 50 mL volumetric flask were then mixed to form the calibration standard solution. The mass of triphenylphosphine sulfide, triphenylphosphine, and triphenylphosphate for each calibration standard solution was recorded and the triphenylphosphine sulfide to triphenylphosphate mass ratio and triphenylphosphine to triphenylphosphate mass ratio was calculated for each calibration standard solution. Table A below provides data for the preparation of one representative set of calibration standard solutions.

TABLE A

GC calibration standards and GC experimental data

| | 1 | 2 | 3 | 4 | 5 |
|---|---|---|---|---|---|
| Internal Standard Preparation Data and Mass Ratios | | | | | |
| $TPPO_4$ (g) | 0.0040 | 0.0040 | 0.0040 | 0.0040 | 0.0040 |
| TPPS (g) | 1.4248 | 0.7171 | 0.1413 | 0.1053 | 0.0708 |
| TPP (g) | 0.0006 | 0.6371 | 1.1442 | 1.1835 | 1.2078 |
| TPP mass % | 0.02 | 48.27 | 88.90 | 91.44 | 93.38 |
| TPPS mass % | 99.32 | 50.95 | 10.24 | 7.34 | 5.30 |
| TPPS/$TPPO_4$ mass ratio | 356.200 | 179.275 | 35.325 | 26.325 | 17.700 |
| TPP/$TPPO_4$ mass ratio | 0.150 | 159.275 | 286.050 | 295.875 | 301.950 |
| Gas Chromatographic Analysis Area Counts and Ratios | | | | | |
| TPP area count | 392.1 | 721448.0 | 1347386.5 | 1796891.8 | 1609634.7 |
| $TPPO_4$ area count | 5146.71 | 4329.50 | 4618.22 | 5686.23 | 5108.28 |
| $TPPO_4$ mass % | 0.30 | 0.29 | 0.30 | 0.29 | 0.30 |
| TPPS area count | 1692734.4 | 758424.52 | 155235.13 | 143926.38 | 91418.92 |
| TPP/$TPPO_4$ area count ratio | 0.076 | 166.635 | 291.754 | 316.007 | 315.103 |
| TPPS/$TPPO_4$ area count ratio | 328.897 | 175.176 | 33.614 | 25.311 | 17.896 |

| | 6 | 7 | 8 | 9 | 10 |
|---|---|---|---|---|---|
| Internal Standard Preparation Data and Mass Ratios | | | | | |
| $TPPO_4$ (g) | 0.0040 | 0.0040 | 0.0040 | 0.0040 | 0.0040 |
| TPPS (g) | 0.0427 | 0.0132 | 0.0072 | 0.0014 | 0.0003 |
| TPP (g) | 1.2349 | 1.2594 | 1.26540 | 1.2710 | 1.2722 |
| TPP mass % | 95.13 | 97.13 | 96.72 | 97.75 | 96.61 |
| TPPS mass % | 3.27 | 1.04 | 0.69 | 0.17 | 0.12 |
| TPPS/$TPPO_4$ mass ratio | 10.675 | 3.300 | 1.800 | 0.350 | 0.200 |
| TPP/$TPPO_4$ mass ratio | 308.725 | 314.850 | 316.350 | 317.750 | 318.050 |
| Gas Chromatographic Analysis Area Counts and Ratios | | | | | |
| TPP area count | 1353715.3 | 1706007.8 | 1532490.2 | 1750961.2 | 1532951.2 |
| $TPPO_4$ area count | 3951.53 | 5243.84 | 4688.74 | 5352.18 | 4576.36 |
| $TPPO_4$ mass % | 0.28 | 0.30 | 0.30 | 0.30 | 0.29 |
| TPPS area count | 46482.72 | 18298.07 | 10789.71 | 2974.74 | 1935.53 |
| TPP/$TPPO_4$ area count ratio | 342.580 | 325.335 | 326.845 | 327.149 | 334.972 |
| TPPS/$TPPO_4$ area count ratio | 11.763 | 3.489 | 2.301 | 0.556 | 0.423 |

Figure 1:
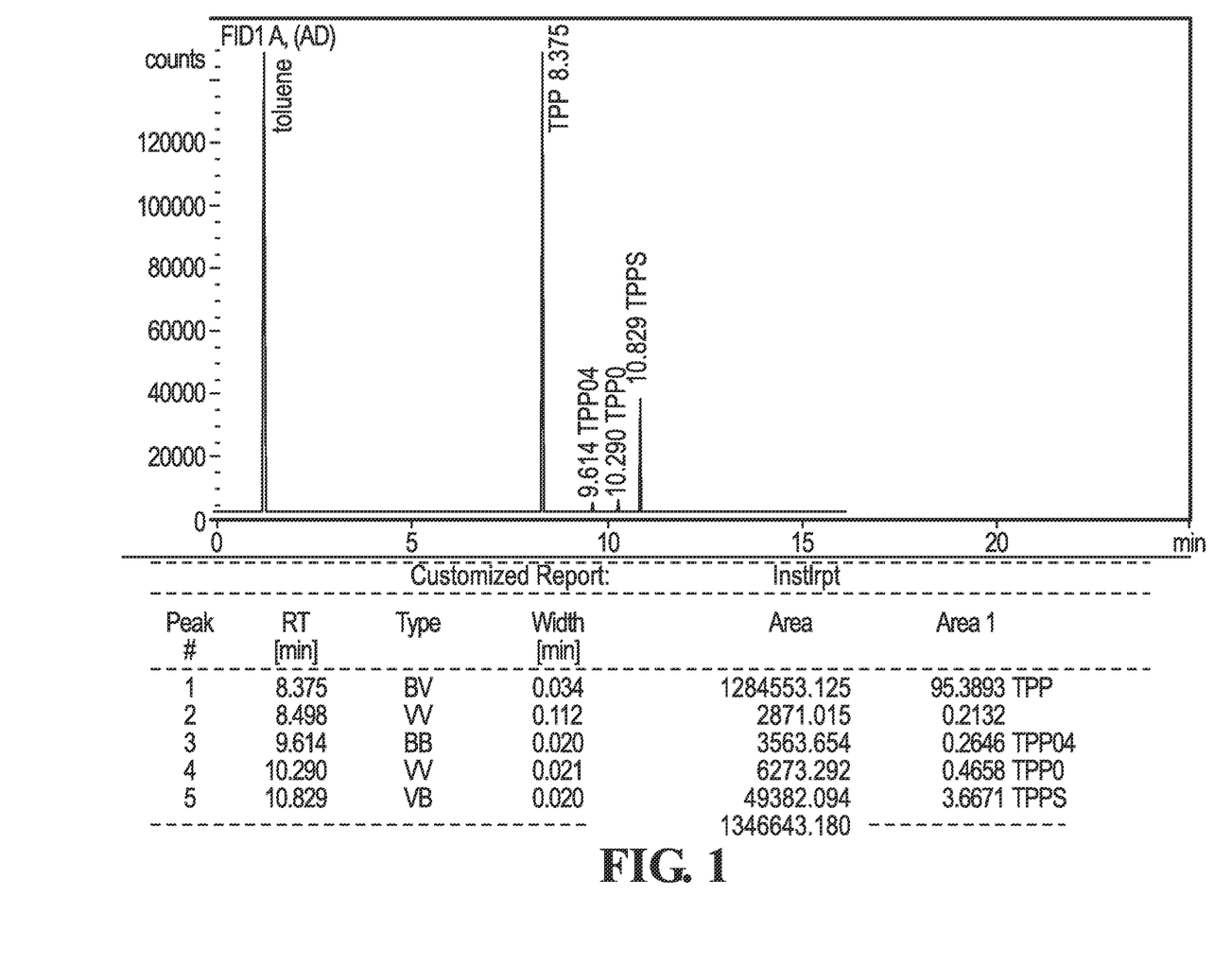
FIG. 1 presents an illustrative gas chromatograph plot showing the respective peaks and retention times for toluene, triphenylphosphine, triphenylphosphate, triphenylphosphine oxide, and triphenylphosphine sulfide.

Sample analysis, calibration standard solution analyses, and test solution analyses, were performed by injecting a 1 μL sample of the appropriate sample unto the gas chromatographic system equipped as described herein, using the following gas chromatographic analysis conditions:

1. Injector Conditions
Sample Inlet Temperature—275° C.
Helium flow rate—Constant Flow at 2.0 mL/min
Split Ratio—1:1
2. Oven Temperature Program
Initial Temperature—120° C.
Initial Time—0 minutes
Temperature Ramp—15° C./min to 300° C.
Final Temperature—300° C.
Final Time—20 minutes
3. Detector Conditions
Flame Ionization Detector (FID) Temperature—325° C.
$H_2$ Flow rate—Constant Flow at 10 mL/min
Air Flow rate—Constant Flow at 150 mL/min Calibration curves were prepared as follows. The total area count and the individual area count for triphenylphosphine, triphenylphosphate, and triphenylphosphine sulfide were measured for each gas chromatographic analysis and recorded. The triphenylphosphine sulfide to triphenylphosphate area count ratio and the triphenylphosphine to triphenylphosphine area count ratio from the gas chromatographic analysis of the calibration standard solutions were determined and recorded. FIG. 1 provides a representative gas chromatograph providing the associated peaks and retention times for toluene, triphenylphosphine, triphenylphosphate, triphenylphosphine oxide, and triphenylphosphine sulfide. Table A provides the individual area counts for triphenylphosphine, triphenylphosphate, and triphenylphosphine sulfide, and the triphenylphosphine sulfide to triphenylphosphate area count ratio and triphenylphosphine to triphenylphosphine area count ratio for a single gas chromatographic analysis of each calibration standard solution.

Figure 2:
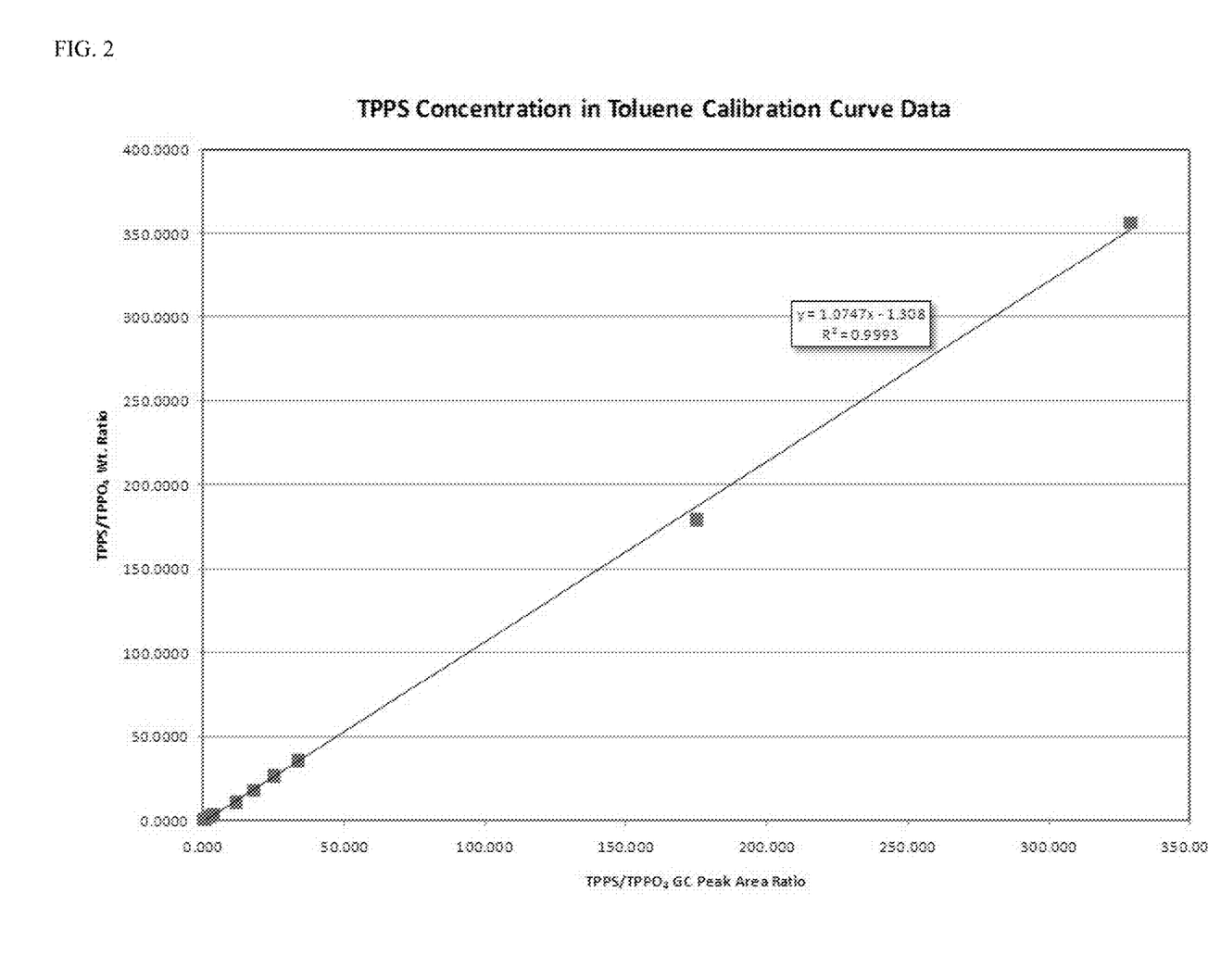
FIG. 2 presents an illustrative triphenylphosphine sulfide calibration curve.

Each calibration standard solution was measured 3 times and the average result of the three analyses was used to construct a triphenylphosphine sulfide calibration curve. The triphenylphosphine sulfide calibration curve was constructed by plotting the triphenylphosphine sulfide/triphenylphosphate mass ratio vs. the triphenylphosphine sulfide/triphenylphosphate area count ratio. Generally, the plot of triphenylphosphine sulfide/triphenylphosphate mass ratio vs. the triphenylphosphine sulfide/triphenylphosphate area count ratio was fit to a linear equation with a high $R^2$ value (greater than 0.99). FIG. 2 illustrates a sample triphenylphosphine sulfide calibration curve.

The elemental sulfur and/or polysulfane content analysis of the hydrogen sulfide samples had these steps.
A. Prepare a triphenylphosphine/triphenylphosphate stock solution having a triphenylphosphine concentration of approximately 0.025 g/mL and a triphenylphosphate concentration of approximately 0.04 g/mL in reagent grade toluene.
B. Contact the triphenylphosphine/triphenylphosphate stock solution with a known amount of liquid $H_2S$ sample having from $1\times10^{-4}$ grams to $1.5\times10^{-1}$ grams of elemental sulfur and/or polysulfanes and react the elemental sulfur and/or polysulfanes with the triphenylphosphine in the triphenylphosphine/triphenylphosphate stock solution to form triphenylphosphine sulfide. Preferably the liquid hydrogen sulfide sample should be contacted with the triphenylphosphine/triphenylphosphate stock solution in an amount such that half of the triphenylphosphine in the triphenylphosphine/triphenylphosphate remains after reacting the elemental sulfur and/or polysulfanes in the liquid hydrogen sulfide sample with the triphenylphosphine in the triphenylphosphine/triphenylphosphate stock solution to ensure that there is an adequate amount of triphenylphosphine to react with the elemental sulfur and/or polysulfanes. Vent hydrogen sulfide from the test sample.
C. Perform a gas chromatographic analysis on the remaining toluene solution and use the calibration curve to determine the amount of triphenylphosphine sulfide in the toluene solution.
D. Calculate the amount of elemental sulfur and/or polysulfanes (as ppm by weight, or ppmw, sulfur) using the amount of liquid hydrogen sulfide contacted with the triphenylphosphine/triphenylphosphate stock solution.

If the elemental sulfur and/or polysulfane content of the hydrogen sulfide is not known, preliminary hydrogen sulfide sample analyses may need to be performed to determine the appropriate hydrogen sulfide charge quantity and/or triphenylphosphine/triphenylphosphate stock solution charge quantity to obtain a triphenylphosphine sulfide to triphenylphosphate area count ratio falling well within the range of the calibration curve.

A triphenylphosphate stock solution was prepared by charging a clean, dry 50 mL volumetric flask with 1.95 grams of triphenylphosphate and 25 mL of reagent grade toluene. The 50 mL volumetric flask was then swirled to dissolve the triphenylphosphate. Once the triphenylphosphate dissolved, the 50 mL volumetric flask was filled to the line with reagent grade toluene and then thoroughly mixed to from the triphenylphosphate stock solution. The concentration of the triphenylphosphate stock solution was then calculated and recorded (0.039 g/mL triphenylphosphate).

A triphenylphosphine/triphenylphosphate stock solution was prepared by charging a clean dry 500 mL volumetric flask with 12.72 g of triphenylphosphine. Using a volumetric pipet, a 1 mL portion of the previously prepared triphenylphosphate stock solution was transferred to the 500 mL volumetric flask by volumetric pipet. The 500 mL volumetric flask was then charged with 250 mL of reagent grade toluene and swirled to dissolve the triphenylphosphine. Once the triphenylphosphine dissolved, the 500 mL volumetric flask was filled to the line with reagent grade toluene and then thoroughly mixed to from the triphenylphosphine/triphenylphosphate stock solution. The concentration of the triphenylphosphine/triphenylphosphate stock solution was then calculated and recorded (0.02544 g/mL triphenylphosphine, $7.80\times10^{-5}$ g/mL triphenylphosphate).

All operations handling triphenylphosphine and/or solutions containing triphenylphosphine were performed to minimize contact with air to minimize triphenylphosphine oxide formation. The triphenylphosphine/triphenylphosphate stock solution often can be stored for up to 6 months in a refrigerator if the stock solution is sealed well and protected from air.

Testing for sulfur-containing impurities was performed as follows. Using a volumetric pipet, 50 mL of the previously prepared triphenylphosphine/triphenylphosphate stock solution was charged to a clean, appropriately sized testing vessel (e.g., 1 L autoclave), equipped as described herein. The testing vessel was sealed, then pressurized to 500 psig with nitrogen, and checked to ensure that it was free of leaks. The nitrogen pressure was then released so that the testing vessel pressure returned to atmospheric pressure. Stirring of the triphenylphosphine/triphenylphosphate stock solution was then initiated and the triphenylphosphine/triphenylphosphate stock solution brought to a temperature of 25° C. Next, a liquid hydrogen sulfide sample (ranging from 25 to 156 grams) was charged to the testing vessel over a period of 5 to 10 minutes, and the amount charged was recorded. The testing vessel was then sealed and additional nitrogen pressure was added (if necessary) to ensure that the hydrogen sulfide was in a liquid state. The hydrogen sulfide and triphenylphosphine/triphenylphosphate stock solution mixture was then stirred and maintained at 25° C. for 30 minutes.

Upon completion of the 30 minute reaction period, hydrogen sulfide was vented from the testing vessel. The testing vessel was then swept with dry nitrogen for approximately 30 minutes as an additional precaution to purge hydrogen sulfide from the testing vessel. The testing vessel was then pressured to 30 psig with nitrogen, the hydrogen sulfide test solution removed from the reactor, and a gas chromatographic sample of the hydrogen sulfide test solution collected in a small gas chromatogram test vial.

A 1 µL sample of the hydrogen sulfide test solution was injected into the GC using the method described herein. The total area count and the individual area count for triphenylphosphine, triphenylphosphate, and triphenylphosphine sulfide were measured from the gas chromatographic analysis and recorded. The triphenylphosphine sulfide to triphenylphosphate area count ratio and triphenylphosphine to triphenylphosphine area count ratio from the gas chromatographic analysis of the hydrogen sulfide test solution were determined and recorded. The hydrogen sulfide test solution was analyzed three times and the average triphenylphosphine sulfide to triphenylphosphate area count ratio and triphenylphosphine to triphenylphosphine area count ratio determined for the hydrogen sulfide test solution.

The amount of sulfur-containing impurities (e.g., elemental sulfur and/or polysulfanes) in the hydrogen sulfide sample was then calculated using the gas chromatographic calibration curve, the amount of the triphenylphosphine/triphenylphosphate stock solution used for the hydrogen sulfide test, the concentration of triphenylphosphate in the triphenylphosphine/triphenylphosphate stock solution, and the quantity of hydrogen sulfide used in the hydrogen sulfide test. First, the amount of triphenylphosphine in the hydrogen sulfide test solution was determined utilizing the calibration curve. Then utilizing the calibration curve in FIG. 2, the mass of triphenylphosphine was calculated using the equation:

TPPS (g)={[TPP/TPPO$_4$ stock solution volume (mL)×TPPO$_4$ concentration TPP/TPPO$_4$ stock solution (g/mL)]×[1.0747×(Hydrogen Sulfide test solution TPPS/TPPO4 area count ratio)−1.308]}.

In this equation, TPPS is triphenylphosphine sulfide, TPP is triphenylphosphine, TPPO$_4$ is triphenylphosphate, 1.0747 is the slope of the linear fit of the calibration curve in FIG. 2, and 1.308 is the y-intercept of linear fit of the calibration curve in FIG. 2.

The amount of sulfur-containing impurities (e.g., elemental sulfur and/or polysulfanes) in the hydrogen sulfide test sample was then calculated using the equation:

Sulfur impurities (ppmw)={[(TPPS (g)/294.35 g/mol)×32.06 g/mol]/H$_2$S sample mass (g)}×10$^6$.

In this equation, 294.35 g/mol is the molecular weight of TPPS, 32.06 g/mol is the molecular weight of sulfur, and 10$^6$ converts the results to ppmw.

The accuracy of this analytical method was validated by contacting a test solution having a known amount of sulfur dissolved in THF. A THF test solution having approximately 25 ppmw elemental sulfur was prepared, and contacted with a triphenylphosphine/triphenylphosphate test solution, under a nitrogen atmosphere with stirring, at 25° C. for 30 minutes. The reacted solution was analyzed by gas chromatography, and the amount of elemental sulfur was calculated using the calibration curve and appropriate equations. Using this method, two independent tests provided results of 24.8 ppmw and 25.6 ppmw for the THF solution containing 25 ppmw sulfur.

Hydrogen Sulfide Purification Examples 1-41

Table I summarizes certain solid catalytic sorbent materials that were evaluated, and their description and respective average particle size. Table II summarizes the solid catalytic sorbent materials used in Examples 1-7, the operating conditions, and the effectiveness of the respective solid catalytic sorbent materials in removing sulfur-containing impurities from a H$_2$S feed stream. The clay solid catalytic sorbent A (Oil-Dri® clay) removed about 30-35 wt. % of the impurities from the H$_2$S feed stream. The performance of the carbon based solid catalytic sorbents (J—coal sourced carbon from Calgon® Carbon, D—Coal Source Carbon from Cabot Norit, and E—Coconut Source Carbon) ranged from <30 wt. % of impurities removed up to 57 wt. %. The solid catalytic sorbents H (styrene-divinylbenzene) and F (3 A molecular sieves) were relatively ineffective in removing the impurities from the H$_2$S feed stream. Table II indicates that none of the solid catalytic sorbents tested in Examples 1-7 removed more than 60 wt. % of the sulfur-containing impurities from the H$_2$S stream.

Table III summarizes the solid catalytic sorbent materials used in Examples 8-11, the operating conditions, and the effectiveness of the respective solid catalytic sorbent materials in removing sulfur-containing impurities from a H$_2$S feed stream. Solid catalyst sorbent K (alkali metal hydroxide impregnated activated carbon) was prepared from solid catalytic sorbent D (activated carbon) by dissolving 75 g of 98-99% NaOH pellets in 75.4 g of deionized water, and mixing this solution with 70 g of solid catalytic sorbent D in a beaker, soaking the carbon for 1 hr, filtering through #41 ashless paper using a vacuum flask, and then drying in an oven for 12 hr at 115° C. Solid catalytic sorbent K contained 18.2 wt. % Na. Solid catalytic sorbent L (alkali metal hydroxide impregnated clay) was prepared from solid catalytic sorbent A by dissolving 4 g of 98-99% NaOH pellets in 100 g of deionized water, mixing the solution with 100 g of solid catalytic sorbent A in a beaker, soaking the clay for 1 hr, filtering through #41 ashless paper using a vacuum flask, and then drying in an oven for 12 hr at 115° C.

In Table III, the H$_2$S feed stream flow orientation was upward through the fixed bed for Example 8, and downward for Examples 9-11. Table III indicates that all of solid catalytic sorbents in Examples 8-11 were able to remove over 60 wt. % of the sulfur-containing impurities from the H$_2$S stream. By comparing Examples 8-9 to Examples 1-2 and 6, it was determined that the alkali metal hydroxide impregnation of clay or carbon unexpectedly increased the amount of impurities removed by 30-40 wt. %. Similar performance was also unexpectedly achieved using solid catalytic sorbent G (alkali metal hydroxide impregnated alumina): 73 wt. % of the sulfur-containing impurities from the H$_2$S feed stream were removed.

Table IV summarizes the solid catalytic sorbent materials used in Examples 12-19, the operating conditions, and the effectiveness of the respective sorbent combinations in removing sulfur-containing impurities from a H₂S feed stream. Examples 12-14 used a mixed bed of solid catalytic sorbents G (⅓ by volume) and D (⅔ by volume), and the H₂S feed stream flow orientation was downward. Examples 15 and 17 used a segregated bed of solid catalytic sorbents G (⅓ by volume) and D (⅔ by volume), and the H₂S feed stream flow orientation was downward. Example 16 used a segregated bed of solid catalytic sorbents G (⅓ by volume) and D (⅔ by volume), and the H₂S feed stream flow orientation was upward. Example 18 used a segregated bed of solid catalytic sorbents G (½ by volume) and D (½ by volume), and the H₂S feed stream flow orientation was upward. Example 19 used a segregated bed of solid catalytic sorbents G (⅓ by volume) and A (⅔ by volume), and the H₂S feed stream flow orientation was upward.

Table IV indicates that the addition of alkali metal hydroxide impregnated alumina to either carbon or clay in a mixed or segregated bed resulted in unexpected increases in the amount of impurities removed by 20-50 wt. % over the carbon or clay materials alone (see Examples 12-19 versus Examples 1-2 and 6).

Table V summarizes the solid catalytic sorbent materials used in Examples 20-24, the operating conditions, and the effectiveness of the respective sorbent materials and combinations in removing sulfur-containing impurities from a H₂S feed stream. In examples 20-21, a dryer bed containing either sorbent F (molecular sieve drying agent) or sorbent I (calcium sulfate drying agent), operating at 1 WHSV and 25° C. was used. At these conditions, and with about 50 ppm of moisture entering in the incoming H₂S feed, the moisture content leaving the dryer bed and entering the fixed bed (downward flow) was about 1 ppm.

Examples 20-21 in Table V indicate that the use of sorbent F or sorbent I alone was not effective at removing impurities from a H₂S feed stream. Example 22 shows the amount of impurities removed from the H₂S feed stream when a drying agent is not used prior to the solid catalytic sorbent fixed bed. As shown by Examples 23-24, the use of a drying agent prior to the solid catalytic sorbent fixed bed resulted in an unexpected increase in the amount of impurities removed by 7-10 wt. %.

Table VI summarizes the operating conditions and effectiveness of solid catalytic sorbent B (alkali metal hydroxide impregnated carbon) in removing sulfur-containing impurities from a H₂S feed stream over a long duration of time (Examples 25-30). Upstream of the sorbent bed was a dryer using sorbent F (molecular sieve drying agent), which was replaced with fresh sorbent at 654 hr. Surprisingly, Table VI indicates that solid catalytic sorbent B, in conjunction with drying the H₂S feed stream, was effective at removing 60-70 wt. % of the sulfur-containing impurities from a H₂S feed stream for a time period of over 650 hr at a WHSV of 1.

Table VII summarizes the solid catalytic sorbent materials used in Examples 31-41, the operating conditions, and the effectiveness of the respective solid catalytic sorbent materials or combinations in removing sulfur-containing impurities from a H₂S feed stream. Examples 31-33 and 39-41 used a mixed bed of solid catalytic sorbents G (⅓ by volume) and D (⅔ by volume), while Example 34 used a segregated bed of solid catalytic sorbents G (½ by volume) and D (½ by volume). Examples 31-34 indicate that the removal of impurities from a H₂S feed was improved at lower operating pressures (e.g., less than 250 psig, less than 200 psig, less than 150 psig, less than 50 psig). Examples 35-38 indicate that the removal of impurities from a H₂S feed was improved at lower operating temperatures (e.g., around 25° C.). Examples 39-41 indicate that the removal of impurities from a H₂S feed was improved at WHSV's of about 1.

TABLE I

Summary of Materials A-J

| Sorbent Designation | Material Description | Particle Size |
|---|---|---|
| A | Oil-Dri ® Clay, Bentonite (Oil-Dri of America) | 20-25 mesh |
| B | ST1-X Carbon, KOH ≤10 wt. % (Calgon ® Carbon) | 4 mm pellet |
| C | IVP Carbon, NaOH ≤20% wt. % (Calgon ® Carbon) | 3.6 mm granule |
| D | Darco 4X12 Coal Source Carbon (Cabot Norit) | 12-40 mesh |
| E | 4X8 60CTC Coconut Source Carbon (Carbon Activated Corporation) | 4.75 × 2.36 mm |
| F | 3A Molecular Sieves, Aluminosilicate (UOP) | 8-12 mesh |
| G | Selexsorb ® COS, Sodium/Alkali Treated Alumina (Alcoa Industrial Chemicals) | 7-14 mesh |
| H | Lewatit MP 64 styrene-divinylbenzene, dimethylamino groups free base form (Bayer AG) | 0.3-1.0 mm |
| I | Calcium Sulfate (Aldrich) | 325 mesh |
| J | CAL 12X40 Coal Source Carbon (Calgon ® Carbon) | 12-40 mesh |
| K | NaOH treated Darco 4X12 Coal Source Carbon(Cabot Norit) | — |
| L | NaOH treated Oil-Dri ® Clay | — |

TABLE II

Examples 1-7

| Example | Sorbent | Sorbent weight (g) | Sorbent volume (mL) | WHSV (g/g/hr) | H₂S Flow Rate (g/hr) | Temp (° C.) | Pressure (psig) | Initial Impurity Conc. (ppm) | Final Impurity Conc. (ppm) | % Impurities Removed | % Impurities Remaining |
|---|---|---|---|---|---|---|---|---|---|---|---|
| 1 | A | 38.8 | 57 | 1.5 | 58 | 25 | 40.3 | 91.9 | 60.9 | 34 | 66 |
| 2 | A | 38.8 | 57 | 1.5 | 58 | 25 | 42.7 | 91.9 | 64.6 | 30 | 70 |
| 3 | H | 38.8 | 58 | 1.5 | 58 | 25 | 50.2 | 30.5 | 30.8 | 0 | 100 |

TABLE II-continued

Examples 1-7

| Example | Sorbent | Sorbent weight (g) | Sorbent volume (mL) | WHSV (g/g/hr) | $H_2S$ Flow Rate (g/hr) | Temp (° C.) | Pressure (psig) | Initial Impurity Conc. (ppm) | Final Impurity Conc. (ppm) | % Impurities Removed | % Impurities Remaining |
|---|---|---|---|---|---|---|---|---|---|---|---|
| 4 | F | 47.0 | 57 | 1.5 | 60 | 25 | 41.2 | 42.4 | 32.4 | 24 | 76 |
| 5 | J | 24.7 | 86 | 1.0 | 25 | 25 | 50.0 | 32.8 | 14.2 | 57 | 43 |
| 6 | D | 40.5 | 86 | 0.5 | 20 | 50 | 301.7 | 56.5 | 45.2 | 20 | 80 |
| 7 | E | 41.1 | 86 | 1.0 | 41 | 30 | 348.5 | 101.5 | 74.3 | 27 | 73 |

TABLE III

Examples 8-11

| Example | Sorbent | Sorbent weight (g) | Sorbent volume (mL) | WHSV (g/g/hr) | $H_2S$ Flow Rate (g/hr) | Temp (° C.) | Pressure (psig) | Initial Impurity Conc. (ppm) | Final Impurity Conc. (ppm) | % Impurities Removed | % Impurities Remaining |
|---|---|---|---|---|---|---|---|---|---|---|---|
| 8 | K | 40.1 | 67 | 1.5 | 60 | 25 | 38.4 | 42.4 | 16.6 | 61 | 39 |
| 9 | L | 38.3 | 57 | 1.5 | 58 | 25 | 48.4 | 91.9 | 27.7 | 70 | 30 |
| 10 | C | 37.0 | 86 | 1.0 | 37 | 25 | 50.0 | 17.8 | 6.4 | 64 | 36 |
| 11 | G | 37.7 | 44 | 1.5 | 56 | 25 | 49.1 | 30.5 | 8.1 | 73 | 27 |

TABLE IV

Examples 12-19

| Example | Sorbent | Sorbent weight (g) | Sorbent volume (mL) | WHSV (g/g/hr) | $H_2S$ Flow Rate (g/hr) | Temp (° C.) | Pressure (psig) | Initial Impurity Conc. (ppm) | Final Impurity Conc. (ppm) | % Impurities Removed | % Impurities Remaining |
|---|---|---|---|---|---|---|---|---|---|---|---|
| 12 | G + D | 51.1 | 86 | 1.5 | 77 | 25 | 123.1 | 74.6 | 41.0 | 45 | 55 |
| 13 | G + D | 51.1 | 86 | 0.5 | 25 | 25 | 121.3 | 74.6 | 39.3 | 47 | 53 |
| 14 | G + D | 51.1 | 86 | 1.0 | 51 | 25 | 117.7 | 74.6 | 25.2 | 66 | 34 |
| 15 | G/D | 50.4 | 86 | 1.5 | 75 | 25 | 50.2 | 30.5 | 15.3 | 50 | 50 |
| 16 | G/D | 50.4 | 86 | 1.0 | 50 | 25 | 43.2 | 30.5 | 13.1 | 57 | 43 |
| 17 | G/D | 50.4 | 86 | 1.5 | 75 | 25 | 41.6 | 30.5 | 10.2 | 67 | 33 |
| 18 | G/D | 32.9 | 57 | 1.5 | 49 | 25 | 45.6 | 30.5 | 10.1 | 67 | 33 |
| 19 | G/A | 42.1 | 57 | 1.5 | 58 | 25 | 51.9 | 91.9 | 30.8 | 66 | 34 |

TABLE V

Examples 20-24

| Example | Sorbent | Sorbent weight (g) | Sorbent volume (mL) | WHSV (g/g/hr) | $H_2S$ Flow Rate (g/hr) | Temp (° C.) | Pressure (psig) | Initial Impurity Conc. (ppm) | Final Impurity Conc. (ppm) | % Impurities Removed | % Impurities Remaining |
|---|---|---|---|---|---|---|---|---|---|---|---|
| 20 | F | 47.0 | 57 | 1.5 | 60 | 25 | 41.2 | 42.4 | 32.4 | 24 | 76 |
| 21 | I | 36.3 | 86 | 1.0 | 36 | 25 | 50.0 | 65.1 | 62.6 | 4 | 96 |
| 22 | B | 37.0 | 86 | 1.0 | 37 | 25 | 50.0 | 17.8 | 6.7 | 62 | 38 |
| 23 | F/B | 36.3 | 86 | 1.0 | 36 | 25 | 50.0 | 65.1 | 20.2 | 69 | 31 |
| 24 | I/B | 36.3 | 86 | 1.0 | 36 | 25 | 50.0 | 65.1 | 18.0 | 72 | 28 |

TABLE VI

Examples 25-30

| Example | Time (hr) | Sorbent weight (g) | Sorbent volume (mL) | WHSV (g/g/hr) | H$_2$S Flow Rate (g/hr) | Temp (° C.) | Pressure (psig) | Initial Impurity Conc. (ppm) | Final Impurity Conc. (ppm) | % Impurities Removed | % Impurities Remaining |
|---|---|---|---|---|---|---|---|---|---|---|---|
| 25 | 7 | 36.3 | 86 | 1.0 | 36 | 25 | 50.0 | 56.9 | 20.4 | 64 | 36 |
| 26 | 104 | 36.3 | 86 | 1.0 | 36 | 25 | 50.0 | 35.1 | 11.0 | 69 | 31 |
| 27 | 209 | 36.3 | 86 | 1.0 | 36 | 25 | 50.0 | 65.1 | 17.5 | 72 | 27 |
| 28 | 287 | 36.3 | 86 | 1.0 | 36 | 25 | 50.0 | 65.1 | 19.1 | 71 | 29 |
| 29 | 654 | 36.3 | 86 | 1.0 | 36 | 25 | 50.0 | 65.1 | 24.6 | 62 | 38 |
| 30 | 720 | 36.3 | 86 | 1.0 | 36 | 25 | 50.0 | 65.1 | 30.7 | 53 | 47 |

TABLE VII

Examples 31-41

| Example | Sorbent | Sorbent weight (g) | Sorbent volume (mL) | WHSV (g/g/hr) | H$_2$S Flow Rate (g/hr) | Temp (° C.) | Pressure (psig) | Initial Impurity Conc. (ppm) | Final Impurity Conc. (ppm) | Flow Orientation | % Impurities Remaining |
|---|---|---|---|---|---|---|---|---|---|---|---|
| 31 | G + D | 51.1 | 86 | 1.0 | 51 | 25 | 349.8 | 101.5 | 86.1 | Down | 84 |
| 32 | G + D | 51.1 | 86 | 1.0 | 51 | 25 | 138.2 | 74.6 | 28.7 | Down | 39 |
| 33 | G + D | 51.1 | 86 | 1.0 | 51 | 25 | 117.7 | 74.6 | 25.2 | Down | 34 |
| 34 | G/D | 32.9 | 57 | 1.0 | 33 | 25 | 40.2 | 30.5 | 0.2 | Up | 1 |
| 35 | K | 40.1 | 67 | 1.5 | 60 | 25 | 38.4 | 42.4 | 16.6 | Up | 39 |
| 36 | K | 40.1 | 67 | 1.5 | 60 | 35 | 44.7 | 42.4 | 25.2 | Up | 59 |
| 37 | D | 40.5 | 86 | 0.5 | 20 | 50 | 301.7 | 56.5 | 57.7 | Down | 100 |
| 38 | D | 41.2 | 86 | 0.5 | 21 | 25 | 343.0 | 101.5 | 88.7 | Down | 87 |
| 39 | G + D | 50.4 | 86 | 1.5 | 75 | 25 | 50.2 | 30.5 | 15.3 | Down | 50 |
| 40 | G + D | 50.4 | 86 | 1.0 | 50 | 25 | 43.2 | 30.5 | 13.1 | Down | 43 |
| 41 | G + D | 50.4 | 86 | 0.5 | 25 | 25 | 41.3 | 30.5 | 15.8 | Down | 52 |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments typically are described as "comprising" but, alternatively, can "consist essentially of" or "consist of" unless specifically stated otherwise):

Embodiment 1

A process to purify a feed stream comprising hydrogen sulfide (H$_2$S) and sulfur-containing impurities (e.g., elemental sulfur, polysulfanes), the process comprising:

contacting the feed stream with a solid catalytic sorbent to remove at least a portion of the sulfur-containing impurities from the feed stream to form a purified H$_2$S stream;

wherein the solid catalytic sorbent comprises a clay; an alkali metal hydroxide or alkaline earth metal hydroxide impregnated activated carbon; an alkali metal hydroxide or alkaline earth metal hydroxide impregnated alumina; an alkali metal hydroxide or alkaline earth metal hydroxide impregnated alumina combined with a clay; an alkali metal hydroxide or alkaline earth metal hydroxide impregnated alumina combined with an activated carbon; or any combination thereof.

Embodiment 2

The process defined in embodiment 1, wherein the solid catalytic sorbent comprises the clay.

Embodiment 3

The process defined in embodiment 2, wherein the clay comprises a Filtrol Clay®, an Oil-Dri® clay, an alkali metal hydroxide or alkaline earth metal hydroxide impregnated clay, or a combination thereof.

Embodiment 4

The process defined in embodiment 2, wherein the clay comprises a Filtrol® clay.

Embodiment 5

The process defined in embodiment 2, wherein the clay comprises an Oil-Dri® clay.

Embodiment 6

The process defined in embodiment 1, wherein the solid catalytic sorbent comprises the alkali metal hydroxide or alkaline earth metal hydroxide impregnated activated carbon.

Embodiment 7

The process defined in embodiment 1, wherein the solid catalytic sorbent comprises the alkali metal hydroxide or alkaline earth metal hydroxide impregnated alumina.

Embodiment 8

The process defined in embodiment 1, wherein the solid catalytic sorbent comprises the alkali metal hydroxide or alkaline earth metal hydroxide impregnated alumina combined with the clay.

Embodiment 9

The process defined in embodiment 1, wherein the solid catalytic sorbent comprises the alkali metal hydroxide or alkaline earth metal hydroxide impregnated alumina combined with the activated carbon.

Embodiment 10

The process defined in any of embodiments 1 or 6-9, wherein the alkali metal hydroxide or alkaline earth metal hydroxide comprises an alkali metal hydroxide.

Embodiment 11

The process defined in any of embodiments 1 or 6-10, wherein the alkali metal hydroxide comprises lithium hydroxide, sodium hydroxide, potassium hydroxide, or a combination thereof.

Embodiment 12

The process defined in any of embodiments 1 or 6-10, wherein the alkali metal hydroxide comprises sodium hydroxide.

Embodiment 13

The process defined in any of embodiments 1 or 6-10, wherein the alkali metal hydroxide comprises potassium hydroxide.

Embodiment 14

The process defined in any of embodiments 1 or 6-9, wherein the alkali metal hydroxide or alkaline earth metal hydroxide comprises an alkaline earth metal hydroxide.

Embodiment 15

The process defined any of embodiments 1, 6-9, or 14, wherein the alkaline earth metal hydroxide comprises magnesium hydroxide, calcium hydroxide, strontium hydroxide, barium hydroxide, or a combination thereof.

Embodiment 16

The process defined in any of embodiments 1, 6-9, or 14, wherein the alkaline earth metal hydroxide comprises magnesium hydroxide.

Embodiment 17

The process defined in any of embodiments 1, 6-9, or 14, wherein the alkaline earth metal hydroxide comprises calcium hydroxide.

Embodiment 18

The process defined in any of embodiments 1 or 6, wherein the alkali metal hydroxide or alkaline earth metal hydroxide impregnated activated carbon is a sodium hydroxide and/or potassium hydroxide impregnated activated carbon.

Embodiment 19

The process defined in embodiment any of embodiments 1 or 6, wherein the alkali metal hydroxide or alkaline earth metal hydroxide impregnated activated carbon is Calgon® Carbon ST1-X.

Embodiment 20

The process defined in any of embodiments 1 or 7-9, wherein the alkali metal hydroxide or alkaline earth metal hydroxide impregnated alumina is a sodium hydroxide and/or potassium hydroxide impregnated alumina.

Embodiment 21

The process defined in any of embodiments 1 or 7-9, wherein the alkali metal hydroxide or alkaline earth metal hydroxide impregnated alumina is Selexsorb® COS.

Embodiment 22

The process defined in any of embodiments 1-21, wherein the feed stream contacts a fixed bed of the solid catalytic sorbent in a vessel.

Embodiment 23

The process defined in embodiment 22, wherein a combination of solid catalytic sorbents comprises a mixed bed of the solid catalytic sorbents.

Embodiment 24

The process defined in embodiment 22, wherein a combination of solid catalytic sorbents comprises sequential beds of the solid catalytic sorbents.

Embodiment 25

The process defined in any of embodiments 1-24, wherein the feed stream comprises any wt. % of $H_2S$ disclosed herein, e.g., at least 80 wt. %, at least 90 wt. %, from 80 wt. % to 99.999 wt. %, from 90 wt. % to 99.9 wt. %, etc.

Embodiment 26

The process defined in any of embodiments 1-25, wherein the feed stream comprises any minimum amount of sulfur-containing impurities disclosed herein, e.g. a minimum of 5 ppm, a minimum of 10 ppm, a minimum of 25 ppm (by weight), etc.

Embodiment 27

The process defined in any of embodiments 1-26, wherein the feed stream comprises an amount of sulfur-containing impurities in any range disclosed herein, e.g., from 5 to 500 ppm, from 10 to 500 ppm, from 10 to 250 ppm, from 25 to 250 ppm (by weight), etc.

Embodiment 28

The process defined in any of embodiments 1-27, wherein the purified $H_2S$ stream comprises an amount of sulfur-containing impurities in any range disclosed herein, e.g. a maximum of 100 ppm, a maximum of 75 ppm, in a range from 0.5 to 100 ppm, in a range from 1 to 75 ppm (by weight), etc.

Embodiment 29

The process defined in any of embodiments 1-28, wherein any percentage amount disclosed herein of the sulfur-containing impurities are removed from the feed stream to form the purified $H_2S$ stream, e.g., at least 50 wt. %, at least 60 wt. %, from 50 to 99.9 wt. %, from 60 to 99.9 wt. %, etc.

Embodiment 30

The process defined in any of embodiments 1-29, wherein the feed stream and the solid catalytic sorbent are contacted at a temperature in any range disclosed herein, e.g., from 0° C. to 50° C., from 5° C. to 45° C., from 15° C. to 35° C., etc.

Embodiment 31

The process defined in any of embodiments 1-30, wherein the feed stream and the solid catalytic sorbent are contacted at a pressure in any range disclosed herein, e.g., from 34 kPa (5 psia) to 2 MPa (300 psia), from 103 kPa (15 psia) to 1.7 MPa (250 psia), from 173 kPa (25 psia) to 1.3 MPa (200 psia), from 70 kPa (5 psia) to 1.0 MPa (150 psia), etc.

Embodiment 32

The process defined in any of embodiments 1-31, wherein the feed stream and the solid catalytic sorbent are contacted at a WHSV in any range disclosed herein, e.g., from 0.1 to 5, from 0.2 to 2, from 0.4 to 2.5, etc.

Embodiment 33

The process defined in any of embodiments 1-32, wherein the solid catalytic sorbent has a surface area in any range disclosed herein, from 10 $m^2/g$ to 500 $m^2/g$, from 25 $m^2/g$ to 250 $m^2/g$, from 50 $m^2/g$ to 200 $m^2/g$, etc.

Embodiment 34

The process defined in any of embodiments 1-33, wherein the solid catalytic sorbent has any particle configuration (e.g., granule, pellet, particulate, etc.) and/or is in any average particle size range disclosed herein, e.g., from 5 mesh to 50 mesh, from 7 mesh to 40 mesh, from 8 mesh to 35 mesh, etc.

Embodiment 35

The process defined in any of embodiments 1-34, wherein the process further comprises a step of contacting the feed stream with a drying agent to remove at least a portion of moisture ($H_2O$) from the feed stream prior to contacting the feed stream with the solid catalytic sorbent.

Embodiment 36

The process defined in embodiment 35, wherein the drying agent comprises calcium chloride, calcium sulfate, magnesium sulfate, alumina, silica, a molecular sieve, or any combination thereof.

Embodiment 37

The process defined in embodiment 35, wherein the drying agent comprises any suitable molecular sieve, e.g., a UOP Type 3 A molecular sieve, etc.

Embodiment 38

The process defined in any of embodiments 35-37, wherein the feed stream, prior to contacting the drying agent, comprises an amount of $H_2O$ in any range disclosed herein, e.g., a minimum of 0.00001 wt. %, a minimum of 0.001 wt. %, a minimum of 2 wt. %, from 0.00001 to 15 wt. %, from 0.005 to 10 wt. %, from 1 to 8 wt. %, from 0.1 to 5 wt. %, etc.

Embodiment 39

The process defined in any of embodiments 35-38, wherein the feed stream, after contacting the drying agent, comprises an amount of $H_2O$ in any range disclosed herein, e.g., a maximum of 500 ppm, a maximum of 10 ppm, from 0.1 to 500 ppm, from 0.1 to 10 ppm $H_2O$ (by weight), etc.

Embodiment 40

The process defined in any of embodiments 1-39, wherein any minimum disclosed percentage amounts of the sulfur-containing impurities are removed from the feed stream to form the purified $H_2S$ stream over a time period in any range of time periods disclosed herein, e.g., at least 5 hours, at least 24 hours, at least 250 hours, from 5 to 10000 hours, from 5 to 1000 hours, from 24 to 500 hours, from 100 to 750 hours, etc.

Embodiment 41

A $H_2S$ production process comprising:
(a) contacting hydrogen and sulfur under conditions sufficient to produce a feed stream comprising hydrogen sulfide ($H_2S$) and sulfur-containing impurities; and
(b) purifying the feed stream by the process defined in any of embodiments 1-40.

We claim:

1. A process to purify a feed stream comprising sulfur-containing impurities and at least 80 wt. % $H_2S$, the process comprising:
    contacting the feed stream with a solid catalytic sorbent for a time period of at least 100 hours at a temperature in a range from 15° C. to 55° C., a pressure in a range from 34 kPa (5 psia) to 1.3 MPa (200 psia), and a weight hourly space velocity (WHSV) in a range from 0.05 to 2, to remove at least a portion of the sulfur-containing impurities from the feed stream to form a purified $H_2S$ stream;
    wherein the solid catalytic sorbent comprises a potassium hydroxide impregnated activated carbon containing from about 7 to about 18 wt. % potassium; and
    wherein a minimum of 60 wt. % of the sulfur-containing impurities are removed from the feed stream to form the purified $H_2S$ stream.

2. The process of claim 1, wherein the feed stream comprises from 10 to 500 ppm by weight of sulfur-containing impurities and at least 90 wt. % $H_2S$.

3. The process of claim 1, wherein the feed stream comprises at least 98 wt. % $H_2S$.

4. The process of claim 1, wherein the solid catalytic sorbent is in the form of pellets having an average diameter of about 4 mm and an average length of about 6 mm.

5. The process of claim 1, wherein the feed stream contacts a fixed bed of the solid catalytic sorbent, and the fixed bed of the solid catalytic sorbent comprises a combination of solid catalytic sorbents in a mixed bed and/or sequential beds.

6. The process of claim 1, wherein:
the feed stream is contacted with the solid catalytic sorbent for a time period of at least 400 hours; and
for the time period of at least 400 hours, a minimum of 60 wt. % of the sulfur-containing impurities are removed from the feed stream to form the purified $H_2S$ stream.

7. A process to purify a feed stream comprising sulfur-containing impurities and at least 80 wt. % $H_2S$, the process comprising:
(i) contacting the feed stream with a drying agent to remove at least a portion of moisture ($H_2O$) from the feed stream to form a moisture reduced feed stream; and
(ii) contacting the moisture reduced feed stream with a solid catalytic sorbent for a time period of at least 100 hours at a temperature in a range from 15° C. to 55° C., a pressure in a range from 34 kPa (5 psia) to 1.3 MPa (200 psia), and a weight hourly space velocity (WHSV) in a range from 0.05 to 2, to remove at least a portion of the sulfur-containing impurities from the moisture reduced feed stream to form a purified $H_2S$ stream;
wherein the solid catalytic sorbent comprises a potassium hydroxide impregnated activated carbon containing from about 7 to about 18 wt. % potassium; and
wherein a minimum of 60 wt. % of the sulfur-containing impurities are removed from the moisture reduced feed stream to form the purified $H_2S$ stream.

8. The process of claim 7, wherein the drying agent comprises calcium chloride, calcium sulfate, magnesium sulfate, alumina, silica, a molecular sieve, or any combination thereof.

9. The process of claim 7, wherein:
the feed stream comprises from 10 to 500 ppm by weight of sulfur-containing impurities and at least 90 wt. % $H_2S$; and
the moisture reduced feed stream comprises less than 50 ppm by weight of $H_2O$.

10. The process of claim 9, wherein:
the moisture reduced feed stream is contacted with the solid catalytic sorbent for a time period of at least 300 hours; and
for the time period of at least 300 hours, a minimum of 50 wt. % of the sulfur-containing impurities are removed from the moisture reduced feed stream to form the purified $H_2S$ stream.

11. The process of claim 7, wherein:
the moisture reduced feed stream is contacted with the solid catalytic sorbent for a time period of at least 600 hours; and
for the time period of at least 600 hours, a minimum of 50 wt. % of the sulfur-containing impurities are removed from the moisture reduced feed stream to form the purified $H_2S$ stream.

12. A hydrogen sulfide production process comprising:
(a) contacting hydrogen and sulfur under conditions sufficient to produce a feed stream comprising from 10 to 500 ppm by weight of sulfur-containing impurities and at least 90 wt. % $H_2S$;
(b) contacting the feed stream with a solid catalytic sorbent for a time period of at least 100 hours at a temperature in a range from 15° C. to 55° C., a pressure in a range from 34 kPa (5 psia) to 1.3 MPa (200 psia), and a weight hourly space velocity (WHSV) in a range from 0.05 to 2, to remove at least a portion of the sulfur-containing impurities from the feed stream to form a purified $H_2S$ stream;
wherein the solid catalytic sorbent comprises a potassium hydroxide impregnated activated carbon containing from about 7 to about 18 wt. % potassium; and
wherein a minimum of 60 wt. % of the sulfur-containing impurities are removed from the feed stream to form the purified $H_2S$ stream.

13. The process of claim 12, wherein:
the feed stream is contacted with the solid catalytic sorbent for a time period of at least 250 hours; and
for the time period of at least 250 hours, a minimum of 60 wt. % of the sulfur-containing impurities are removed from the feed stream to form the purified $H_2S$ stream.

14. The process of claim 13, wherein the process further comprises a step of contacting the feed stream with a drying agent to remove at least a portion of moisture ($H_2O$) from the feed stream prior to contacting the feed stream with the solid catalytic sorbent.

15. A process to purify a feed stream comprising sulfur-containing impurities and at least 80 wt. % $H_2S$, the process comprising:
contacting the feed stream with a solid catalytic sorbent to remove at least a portion of the sulfur-containing impurities from the feed stream to form a purified $H_2S$ stream;
wherein the solid catalytic sorbent comprises a potassium hydroxide impregnated activated carbon containing from about 7 to about 18 wt. % potassium; and
wherein a minimum of 60 wt. % of the sulfur-containing impurities are removed from the feed stream to form the purified $H_2S$ stream.

16. The process of claim 15, wherein the process further comprises a step of contacting the feed stream with a drying agent to remove at least a portion of moisture ($H_2O$) from the feed stream prior to contacting the feed stream with the solid catalytic sorbent.

17. The process of claim 16, wherein:
the feed stream comprises from 10 to 500 ppm by weight of sulfur-containing impurities and at least 90 wt. % $H_2S$; and
after contacting the feed stream with the drying agent, the feed stream comprises less than 50 ppm by weight of $H_2O$.

18. The process of claim 17, wherein the drying agent comprises calcium chloride, calcium sulfate, magnesium sulfate, alumina, silica, a molecular sieve, or any combination thereof.

19. The process of claim 15, wherein the feed stream comprises at least 98 wt. % $H_2S$.

* * * * *